(No Model.)

J. B. NORTON.
BELT FASTENER.

No. 300,793. Patented June 24, 1884.

WITNESSES
John C. Miller
J. C. Wildman

INVENTOR
John B. Norton
by R. K. Evans
Attorney

N. PETERS. Photo-Lithographer, Washington, D. C.

UNITED STATES PATENT OFFICE.

JOHN BROWN NORTON, OF PHILADELPHIA, PENNSYLVANIA.

BELT-FASTENER.

SPECIFICATION forming part of Letters Patent No. 300,793, dated June 24, 1884.

Application filed November 2, 1883. (No model.)

*To all whom it may concern:*

Be it known that I, JOHN B. NORTON, of Philadelphia, in the county of Philadelphia and State of Pennsylvania, have invented certain Improvements in Belt-Fasteners; and I hereby declare the following to be a full, clear, and exact description of the same, reference being had to the accompanying drawings, making part of this specification, in which—

Figure 1:
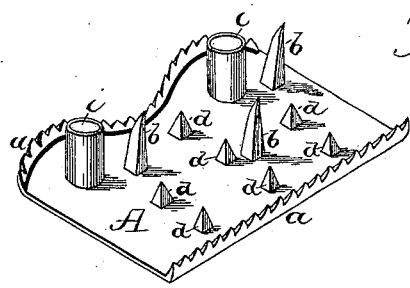
Figure 3:
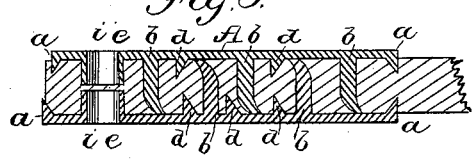
Figure 2:
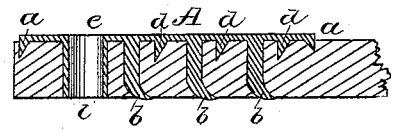
Figure 4:
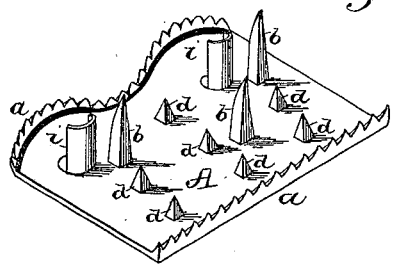
Figure 5:
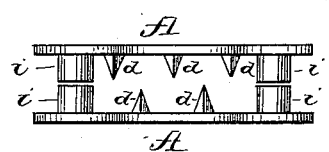

Figure 1 is a perspective view of one of my improved fastening-plates, the holding side uppermost. Fig. 2 is a longitudinal sectional view of the same applied to a belt. Fig. 3 is a longitudinal sectional view of a belt having two of my improved plates applied, one on each side the belt. Figs. 4 and 5 show modifications in the form and dimensions of the fenders attached to the lacing-holes.

My invention relates to those devices attached to the ends of belts to prevent the lacing-holes from becoming distorted or tearing out; and my invention consists in the details of construction of a re-enforcing or fastening plate to be attached to each end of the belt, as hereinafter more specifically set out and claimed.

In order that those skilled in the art may make and use my invention, I will proceed to describe the exact manner in which I have carried it out.

In the said drawings, A is a fastening-plate made of any desired thickness, and conforming in shape, substantially, to the end of the belt. The ends of plate A are turned down, forming lips $a$ $a$ to overlap and lie against the end edge of the belt to prevent it from chafing, and for other purposes hereinafter described. On the holding-face of the plate, or that face lying against the belt when the plate is in position, are projecting pins $b$ $b$, to pass through the belt and be clinched, and pins $d$ $d$, sharpened to enter the body of the belt only. At desirable points the plate is provided with holes $e$ $e$, located coincident with the lacing-holes in the belt for the belt-lacing to pass through. From the edges of holes $e$ $e$ project fenders $i$ $i$, which enter the lacing-holes in the belt when the plate is in position, and form a sort of bushing to the belt-holes against which the lacing bears when the strain is on the belt. These fenders may be made cylindrical and extend entirely through the belt, as seen in Fig. 1; or they may be made cylindrical and only extend half-way through the belt when two plates are used, as seen in Fig. 2. The fenders may also be made semi-cylindrical, the semi-cylinder resting on that side of the belt-hole to resist the strain without departing from the spirit of my invention.

The lips $a$ may be serrated, if desired, so as to be driven into the end of the belt and the other lip lap over it when two plates are used; or both plates may be set back slightly from the end of the belt, or both plates may lap over the end of the belt. The lip $a$ increases the rigidity of the hold of the plate to the belt, and is an additional security against the plate in any degree changing position relative to the end of the belt.

It is evident that the fenders $i$ $i$ may be made sufficiently long to protrude through the belt and be upset and used in conjunction with the short pins $d$ $d$, which only enter the surface of the leather, without departing from the spirit of my invention.

Having thus described my invention, what I claim as new, and desire to secure by Letters Patent, is—

1. In a belt-fastening device, the plate A, provided with projecting fastening-points and lacing-holes $e$ $e$, from the edges of which project fenders $i$ $i$ to pass into the lacing-holes of the belt, substantially as and for the purpose set forth.

2. In a belt-fastening device, the plate A, provided with suitable fastening devices and the lip or lips $a$, as described.

JOHN BROWN NORTON.

Witnesses:
CLAUDE RICHARD NORTON,
DAVID A. NORTON.